(12) United States Patent  (10) Patent No.: US 7,543,099 B2
Han  (45) Date of Patent: Jun. 2, 2009

(54) DIGITAL MULTIMEDIA DEVICE

(75) Inventor: Jae-uk Han, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 11/595,859

(22) Filed: Nov. 13, 2006

(65) Prior Publication Data

US 2007/0198760 A1 Aug. 23, 2007

(30) Foreign Application Priority Data

Feb. 17, 2006 (KR) ................ 10-2006-0015626

(51) Int. Cl.
*G06F 13/00* (2006.01)
*H05K 7/10* (2006.01)
(52) U.S. Cl. ................ 710/303; 710/104; 710/301
(58) Field of Classification Search ........... 710/301, 710/303, 104
See application file for complete search history.

(56) References Cited

U.S. PATENT DOCUMENTS

| | | | | |
|---|---|---|---|---|
| 5,278,730 A | * | 1/1994 | Kikinis | 361/686 |
| 6,049,453 A | * | 4/2000 | Hulsebosch | 361/686 |
| 6,489,932 B1 | * | 12/2002 | Chitturi et al. | 345/30 |
| 6,538,880 B1 | * | 3/2003 | Kamijo et al. | 361/686 |
| 6,697,032 B2 | * | 2/2004 | Chitturi et al. | 345/168 |
| 6,697,251 B1 | * | 2/2004 | Aisenberg | 361/683 |
| 6,798,647 B2 | * | 9/2004 | Dickie | 361/683 |
| 6,961,237 B2 | * | 11/2005 | Dickie | 361/683 |
| 7,197,584 B2 | * | 3/2007 | Huber et al. | 710/72 |
| 2002/0103951 A1 | * | 8/2002 | Huber et al. | 710/72 |
| 2003/0041206 A1 | * | 2/2003 | Dickie | 710/303 |
| 2003/0172217 A1 | * | 9/2003 | Scott et al. | 710/303 |
| 2004/0019724 A1 | * | 1/2004 | Singleton et al. | 710/303 |
| 2004/0210699 A1 | * | 10/2004 | Watts et al. | 710/303 |
| 2004/0268005 A1 | * | 12/2004 | Dickie | 710/303 |
| 2005/0185364 A1 | * | 8/2005 | Bell et al. | 361/679 |
| 2006/0212637 A1 | * | 9/2006 | Lo et al. | 710/303 |
| 2006/0224875 A1 | * | 10/2006 | Choi et al. | 713/1 |
| 2006/0239651 A1 | * | 10/2006 | Chang et al. | 386/96 |
| 2008/0304688 A1 | * | 12/2008 | Kumar | 381/370 |

\* cited by examiner

*Primary Examiner*—Paul R Myers
*Assistant Examiner*—Ryan M Stiglic
(74) *Attorney, Agent, or Firm*—Stein McEwen, LLP

(57) ABSTRACT

A digital multimedia device capable of functioning as both a portable multimedia player (PMP) and a notebook computer is provided. The digital multimedia device includes: a computer unit including a body, a first processor included in the body to operate a first operating system (OS), a first display unit for displaying image information processed by the first processor, and a first input unit; a PMP unit including a second processor to operate a second operating system, a hard disk drive (HDD) for storing programs and data, a second display unit for displaying image information processed by the second processor, and a second input unit; and a docking unit disposed in the computer unit and the PMP unit for docking the PMP unit to the computer unit, wherein, when the PMP unit is docked with the computer unit, the computer unit shares the HDD with the PMP unit to perform processing operations, and the PMP unit operates independently or in association with the computer unit.

20 Claims, 4 Drawing Sheets

DIGITAL MULTIMEDIA DEVICE

CROSS-REFERENCE TO RELATED APPLICATIONS

This application claims all benefits accruing under 35 U.S.C. §119 from Korean Patent Application No. 2006-15626, filed Feb. 17, 2006, in the Korean Intellectual Property Office, the disclosure of which is incorporated herein by reference.

BACKGROUND OF THE INVENTION

1. Field of the Invention

The present invention relates to a digital multimedia device, and more particularly, to a digital multimedia device capable of functioning as a portable multimedia player (PMP) and a notebook computer.

2. Related Art

In general, portable computers, such as notebook computers, have substantially the same power and performance as desktop computers and have the advantage of being highly portable. Notebook computers, however, are larger and heavier than portable digital assistants (PDAs), hand-held personal computers (HPCs), portable multimedia players (PMPs) and the like. As such, notebook computers are relatively less portable than these other digital devices.

A PMP is a digital device which enables a user to manage data and view multimedia files including movie and music, and has the advantages of being highly portable and convenient to use during transit. As a result, PMPs have been highlighted as digital devices which are able to substitute MP3 players. In recent years, PMPs have been greatly improved in portability and convenience of use; however, each PMP still needs to be mounted to some devices because of its size. This makes it difficult for PMPs to have substantially the same power and performance as notebook computers.

Both the notebook computers and PMPs have different advantages and disadvantages. As a result, there is a need to utilize both a notebook computer and a PMP in a way that all the advantages of both the PMP and the notebook computer are captured.

SUMMARY OF THE INVENTION

Several aspects and example embodiments of the present invention provide a digital multimedia device capable of functioning as both a portable multimedia player (PMP) and a notebook computer.

Additional aspects and/or advantages of the invention will be set forth in part in the description which follows and, in part, will be obvious from the description, or may be learned by practice of the invention.

In accordance with an example embodiment of the present invention, there is provided a digital multimedia device comprising: a computer unit including a body, a first microprocessor included in the body to operate a first operating system (OS), a first display unit for displaying image information processed by the first microprocessor, and a first input unit; a portable multimedia player (PMP) unit including a second microprocessor to operate a second operating system, a hard disk drive (HDD) for storing programs and data, a second display unit for displaying image information processed by the second microprocessor, and a second input unit; and a docking unit disposed in the computer unit and the PMP unit for docking the PMP unit to the computer unit, wherein, when the PMP unit docks with the computer unit, the computer unit shares the HDD with the PMP unit to perform processing operation; and the PMP unit operates independently or in association with the computer unit.

According to an aspect of the present invention, the docking unit comprises a docking portion disposed in the body of the computer unit, to receive the PMP unit mounted thereon; and first and second connectors disposed in the docking unit and the PMP unit respectively, for establishing connection between the computer unit and the PMP unit, when the PMP unit is docked with the computer unit.

According to another aspect of the present invention, the computer unit is further provided with a window disposed in the body for enabling an image displayed on the second display unit of the PMP unit to be viewed by a user, when the PMP unit is mounted in the docking portion of the computer unit.

According to yet another aspect of the present invention, the computer unit is further provided with an eject member disposed corresponding to the docking portion of the computer unit for ejecting the PMP unit from the docking portion of the computer unit.

According to an aspect of the present invention, the computer unit is further provided with a slot on a side to accommodate the PMP unit, and a window on a surface to enable a user to view the second display unit of the PMP unit, when the PMP unit is inserted in the slot.

According to an aspect of the present invention, the PMP unit may correspond to a MP3 player, and the computer unit may correspond to one of a notebook computer, a portable digital assistant (PDA), a hand-held PC, and a mobile device.

In accordance with another example embodiment of the present invention, a digital multimedia device comprises a main body; a processor included in the main body to operate an operating system (OS); a display panel connected to the main body to provide a visual display of information; a keyboard located on a surface of the main body; a slot provided on a side of the main body to accommodate an insertion of a portable multimedia player (PMP) unit having a hard disk drive (HDD) to store data and programs; and a window located on the surface of the main body, adjacent to the keyboard, to enable a user to view a display panel of the PMP unit, when the PMP unit is inserted in the slot; wherein, when the PMP unit is inserted into the slot, the processor shares the hard disk drive (HDD) of the PMP unit to perform operations.

According to an aspect of the present invention, the slot is provided with a docking portion to receive the PMP unit mounted thereon, and a connector arranged to establish communication with the PMP unit, when the PMP unit is mounted on the docking portion.

According to another aspect of the present invention, an eject member is further disposed corresponding to the docking portion for enabling a user to eject the PMP unit from the docking portion.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
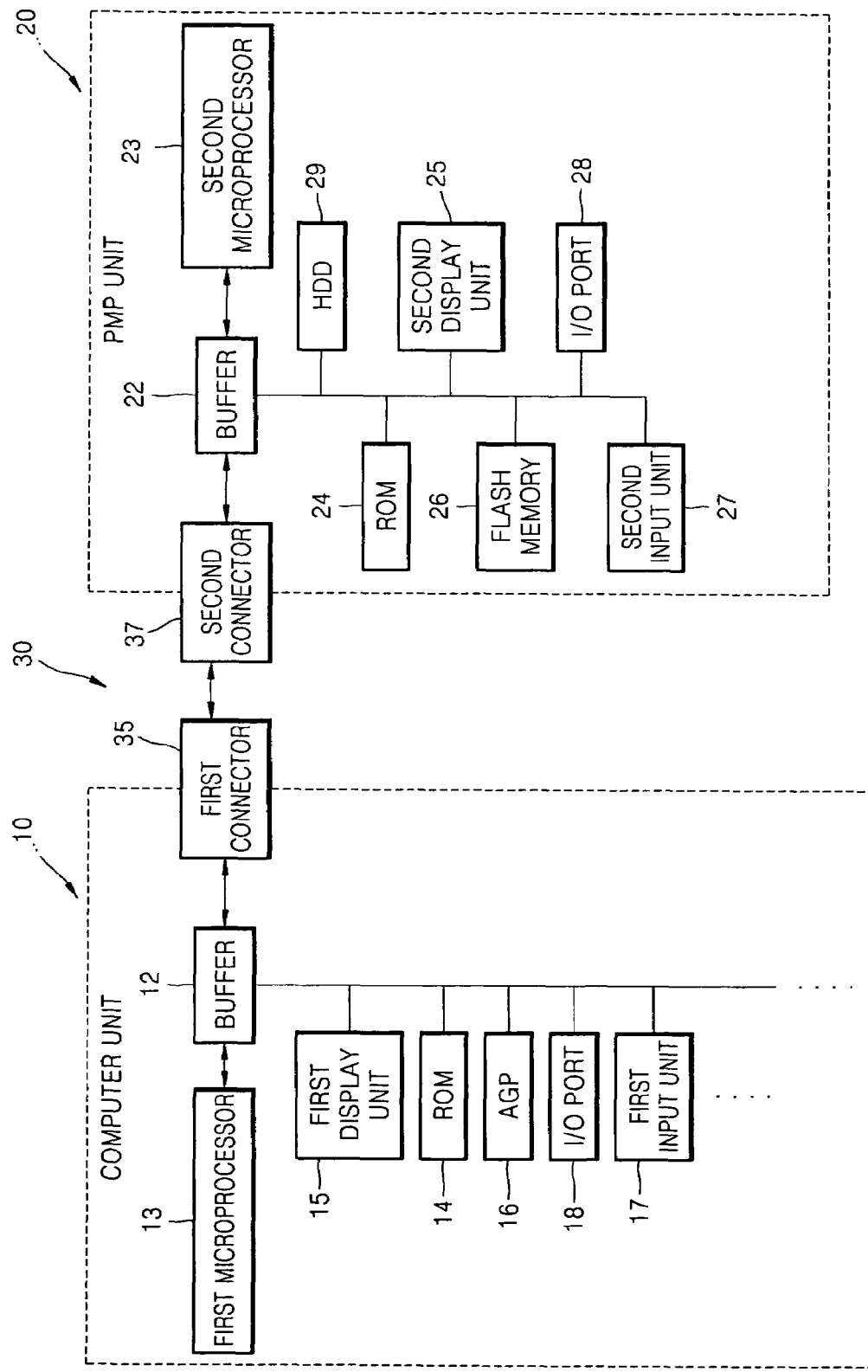
FIG. 1 is a schematic block diagram of a digital multimedia device according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a digital multimedia device according to example embodiments of the present invention will be described in detail with reference to the accompanying drawings.

Figure 2:
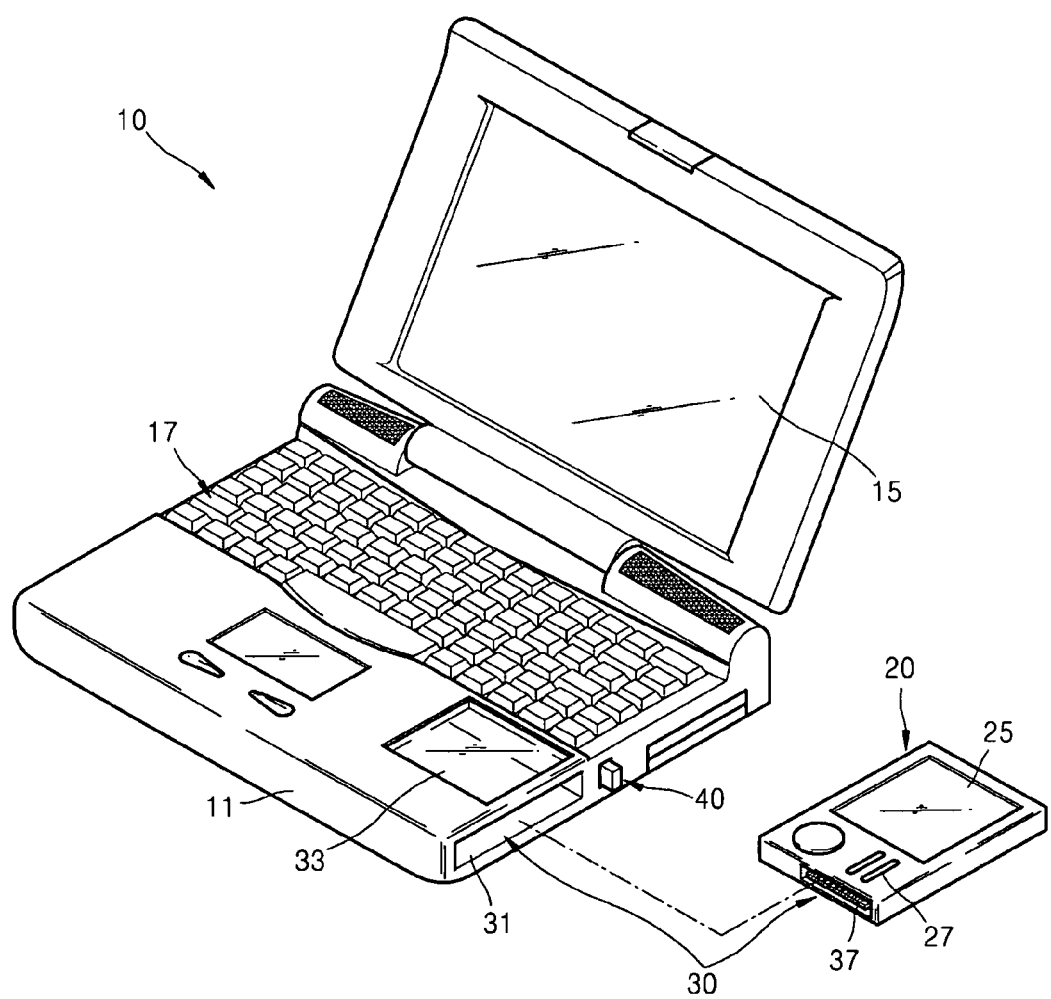
FIG. 2 is a schematic perspective view of a digital multimedia device according to an example embodiment of the present invention.
Figure 3:
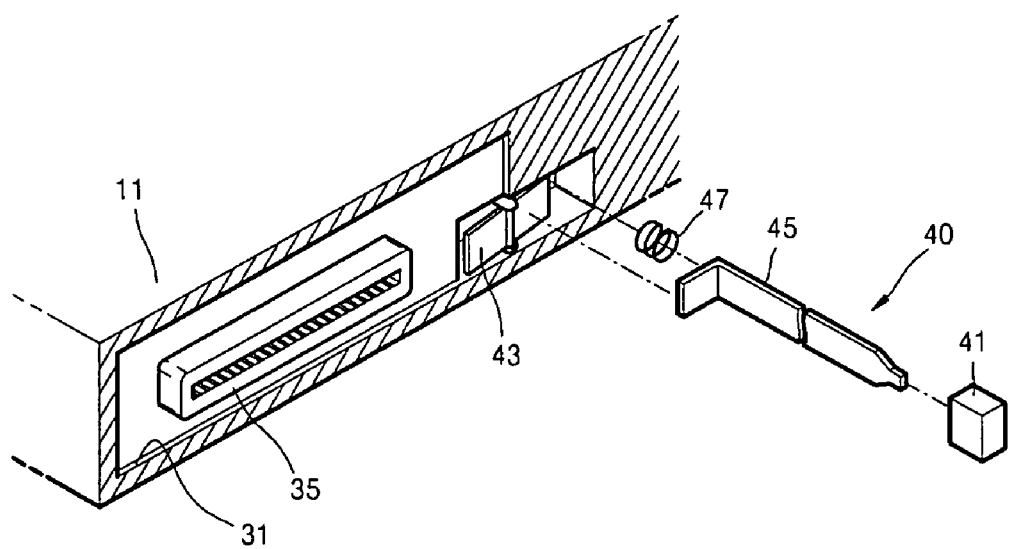
FIG. 3 is a partial perspective view of a primary portion of the digital multimedia device of FIG. 2.
Figure 4:
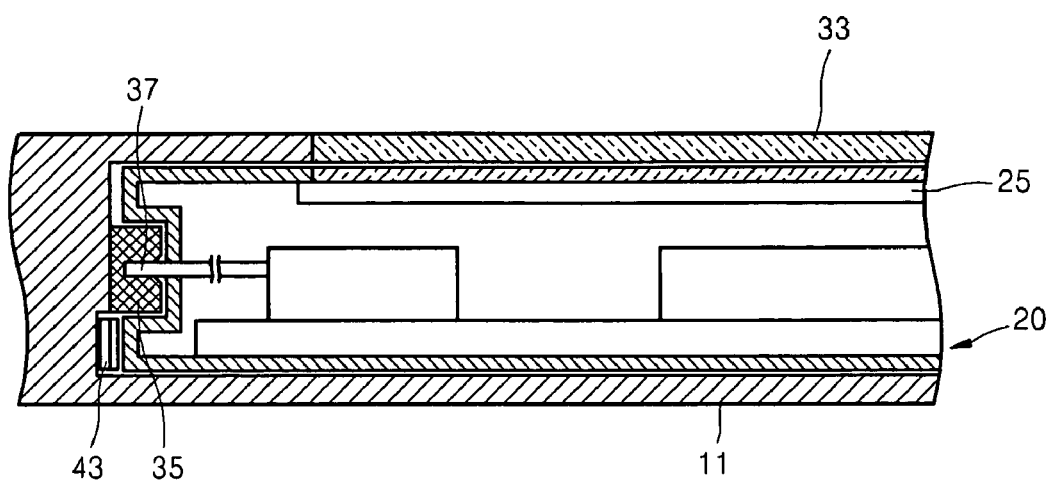
FIG. 4 is a schematic cross-sectional view of the primary portion of FIG. 2.

FIGS. 1 and 2 are a schematic block diagram and a schematic perspective view of a digital multimedia device according to an example embodiment of the present invention, respectively. FIG. 3 is a partial sectional perspective view of a primary portion taken from FIG. 2, and FIG. 4 is a schematic partial sectional view of the primary portion taken from FIG. 2.

Referring to FIGS. 1 to 4, a digital multimedia device according to an example embodiment of the present invention includes a computer unit 10 operating on a first operating system (OS), a portable multi-media player (PMP) unit 20 operating on a second operating system (OS), and a docking unit 30 for docking the PMP unit 20 with the computer unit 10.

The computer unit 10 is a small-sized portable computer. The computer unit 10 has a substantially the same configuration as a notebook computer. For example, such a computer unit 10 includes a body 11 similar to the body of a notebook computer, and a first display unit 15, such as a display panel, hinge-connected to the body 11. However, the computer unit 10 according to an example embodiment of the present invention is not provided with a hard disc drive (HDD) that is a disc-shaped information recording medium so as to maximize its portability and mobility. Rather, such a computer unit 10 may utilize an HDD 29 of the PMP unit 20.

Specifically, the computer unit 10 includes a body 11, a first microprocessor 13 included the body 11 to operate the first operating system (OS), the first display unit 15 for displaying image information processed by the first microprocessor 13, and a first input unit 17, such as a key board, for inputting data and control signals.

The PMP unit 20 is a device that is much smaller than the computer unit 10. The PMP unit 20 is highly portable and freely usable for moving images and electronic books. For example, the PMP unit 20 includes a second microprocessor 23 operating on the second operating system (OS), the HDD 29 for storing programs and data, a second display unit 25, such as a built-in display panel, for displaying image information processed by the second microprocessor 23, and a second input unit 27, such as control buttons for inputting data and control signals.

The second display unit 25 is directly formed on the body of the PMP unit 20 and comprises a liquid crystal display (LCD) panel and the like. The second input unit 27 is formed on a portion of the body of the PMP unit 20, adjacent to the second display unit 25, for inputting data and control signals to control images displayed on the second display unit 25. The second input unit 27 is a button structure formed separate from the second display unit 25. Alternatively, the second input unit 27 may be formed as a touch screen on the second display unit 25 for inputting control signals and the like.

According to an example embodiment of the present invention, the second operating system (OS) for the PMP unit 20 and the first operating system (OS) for the computer unit 10 are stored in the HDD 29. However, the operating system (OS) can be stored in a different storage location. When the PMP unit 20 docks with the computer unit 10, the computer unit 10 shares the HDD 29 with the PMP unit 20 to perform operations on the first operating system (OS). The PMP unit 20 performs operations on the second operating system (OS) independently or in association with the computer unit 10.

The docking unit 30 is provided between the computer unit 10 and the PMP unit 20 for docking the PMP unit 20 into the body 11 of the computer unit 10.

The docking unit 30 includes a docking portion 31 disposed in the body 11 of the computer unit 10 into which the PMP unit 20 can be mounted, and first and second connectors 35 and 37 disposed in the docking portion 31 and the PMP unit 20, respectively.

The docking portion 31 is formed as a hollow portion of the body 11 of the computer unit 10, and the first connector 35 is disposed inside the docking portion 31. The PMP unit 20 has a structure corresponding to the docking portion 31 of the computer unit 10. The second connector 37 of the PMP unit 20 is disposed to face the first connector 35. When the PMP unit 20 is docked into the body 11 of the computer unit 10 through the docking portion 31, the first connector 35 and the second connector 37 mate with each other. Here, the first and second connectors 35 and 37 connect the computer unit 10 with the PMP unit 20 electrically and/or optically when the PMP unit 20 docks with the computer unit 10. The docking unit 30 may include an eject member 40 in the docking portion 31 of the computer unit 10 for ejecting the PMP unit 20 from the docking portion 31.

In addition, the computer unit 10 may also include a buffer 12 arranged between the first microprocessor 13 and the first connector 35, a read-only-memory (ROM), an accelerated graphics port (AGP) 16 to communicate with a graphics card; and an input/output (I/O) port 18 to communicate with other I/O devices. Likewise, the PMP unit 20 may also include a buffer 22 arranged between the second microprocessor 23, a read-only-memory (ROM), a flash memory 26 and an I/O port 28 to communicate with other I/O devices.

Referring now to FIG. 3, the eject member 40 includes an eject knob 41, a hinge member 43, and an operation lever 45. The eject member 40 further includes an elastic member 47 for returning the operation lever 45 to its original position by means of elastic bias. The hinge member 43 is disposed to be able to rotate and reciprocate in the docking portion 31. The operation lever 45 has one end connected to the eject knob 41 which partially protrudes from the body 11 of the computer unit 10, and the other end that is in contact with the hinge member 43. Accordingly, when the eject knob 41 is pressed by a user, the hinge member 43 is rotated by the operation lever 45. The PMP unit 20 is thus ejected from the docking portion 31 of the computer unit 10. The elastic member 47 is disposed between the body 11 and the operation lever 45 to move both the operation lever 45 and the eject knob 41 toward their original positions when the eject operation is completed. The structure of the eject member 40 is merely one example and may have various forms.

The digital multimedia device according to an example embodiment of the present invention may further include a window 33 disposed in the body 11 of the computer unit 10. The window 33 enables images displayed on the second display unit 23 of the PMP unit 20 to be viewed when the PMP unit 20 is mounted in the docking portion 31 of the computer unit 10. The window 33 is formed on one face of the body 11 of the computer unit 10 at a location corresponding to the second display unit 23 of the PMP unit 20 when the PMP unit 20 is docked with the computer unit 10, and is coplanar with the first input unit 17. Here, the window 33 is formed of a transparent material, e.g., glass or transparent plastic, as shown in FIG. 2. Alternatively, the window 23 may be an opening having no separate element.

FIG. 4 shows a schematic partial sectional view of the digital multimedia device, when a PMP unit 20 is docked in the docking portion 31 of the computer unit 10. As shown in FIG. 4, when the PMP unit 10 is docked in the docking portion 31 of the computer unit 10, the second connector 37 of the PMP unit 20 is electrically coupled to the first connector 35 of the computer unit 10. The second display unit 25 of the PMP unit 20 is visible through the window 33 on the body 11 of the computer unit 10.

Operation of the digital multimedia device according to the present invention will now be described as follows.

First, the PMP unit 20 is capable of performing unique functions independent of the computer unit 10. This enables a user carrying only the PMP unit 20 to utilize information stored in the HDD 29. The PMP unit 20 may operate even when docked with the docking portion 31 of the computer unit 10.

In this case, an image displayed on the second display unit 23 of the PMP unit 20 can be viewed through the window 33 of the body 11 of the computer unit 10. Further, audio information provided by the PMP unit 20 can be output by an audio system of the PMP unit 20 or the computer unit 10. A control signal and an information signal may be input to the PMP unit 20 through the first input unit 17 of the computer unit 10.

Meanwhile, the computer unit 10 shares the HDD 29 with the PMP unit 20, when the PMP unit 20 is docked with the computer unit 10. When the PMP unit 20 is docked with the computer unit 10, the digital multimedia device according to an example embodiment of the present invention performs substantially the same function as a typical notebook computer. As a result, its detailed description thereof will be omitted for the sake of brevity.

In the configured digital multimedia device according to an example embodiment of the present invention, the computer unit has a structure that shares the HDD with the PMP unit. The digital multimedia device can function as a notebook computer when the PMP unit is docked with the computer unit. In addition, the PMP of the digital multimedia device can be operated even when the PMP unit is docked with the computer unit. In this case, a user can view an image displayed on the second display unit of the PMP unit through the window.

According to the present invention, it is possible to reduce manufacturing costs of a digital multimedia device through sharing one HDD between a computer unit and a PMP, and for the digital multimedia device to function as both a notebook computer and a PMP.

Various components of the computer unit and the PMP unit, as shown in FIG. 1 and FIG. 2, can be configured differently and integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs).

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the computer unit 10, as shown in FIG. 1 and FIG. 2, may be embodied in a portable digital assistant (PDA), a hand-held PC, and other mobile devices, as long as the PMP unit is docked therein. In addition, the hard disk drive (HDD) can be replaced by other computer readable recording media, such as read-only memory (ROM), random-access memory (RAM), CD-ROMs, magnetic tapes, floppy disks, and optical data storage devices. Likewise, an operating system (OS) may be stored in the ROM. Accordingly, it is intended, therefore, that the present invention not be limited to the various example embodiments disclosed, but that the present invention includes all embodiments falling within the scope of the appended claims.

What is claimed is:

1. A digital multimedia device comprising:
    a computer unit including a body, a first processor included in the body to operate a first operating system (OS), a first display unit for displaying image information processed by the first processor, and a first input unit;
    a portable multimedia player (PMP) unit including a second processor to operate a second operating system (OS), a hard disk drive (HDD) for storing programs and data, a second display unit for displaying image information processed by the second processor, and a second input unit; and
    a docking unit disposed in the computer unit and the PMP unit, for docking the PMP unit to the computer unit,
    wherein, when the PMP unit docks with the computer unit, the computer unit shares the HDD with the PMP unit to perform processing operations;
    wherein the PMP unit operates independently or in association with the computer unit; and
    wherein the HDD included in the PMP unit also stores the first OS for processing operations by the computer unit.

2. The digital multimedia device as claimed in claim 1, wherein the docking unit comprises:

a docking portion disposed in the body of the computer unit, to receive the PMP unit mounted thereon; and first and second connectors disposed in the docking unit and the PMP unit respectively, for establishing connection between the computer unit and the PMP unit, when the PMP unit is docked with the computer unit.

3. The digital multimedia device as claimed in claim 2, wherein the computer unit further comprises a window disposed in the body for enabling an image displayed on the second display unit of the PMP unit to be viewed by a user, when the PMP unit is mounted in the docking portion of the computer unit.

4. The digital multimedia device as claimed in claim 2, further comprising an eject member disposed corresponding to the docking portion of the computer unit for ejecting the PMP unit from the docking portion of the computer unit.

5. The digital multimedia device as claimed in claim 3, further comprising an eject member disposed in the docking portion of the computer unit for ejecting the PMP unit from the docking portion of the computer unit.

6. The digital multimedia device as claimed in claim 1 wherein the body of the computer unit is provided with a slot on a side to accommodate the PMP unit, and a window on a surface to enable a user to view the second display unit of the PMP unit, when the PMP unit is inserted in the slot.

7. The digital multimedia device as claimed in claim 1, wherein the PMP unit corresponds to a MP3 player.

8. The digital multimedia device as claimed in claim 1, wherein the computer unit corresponds to one of a notebook computer, a portable digital assistant (PDA), a hand-held PC, and a mobile device.

9. A digital multimedia device comprising:

a main body;

a processor included in the main body to operate an operating system (OS);

a display panel connected to the main body to provide a visual display of information;

a keyboard located on a surface of the main body;

a slot provided on a side of the main body to accommodate an insertion of a portable multimedia player (PMP) unit having a storage device to store data and programs; and a window located on the surface of the main body, adjacent to the keyboard, to enable a user to view a display panel of the PMP unit, when the PMP unit is inserted in the slot;

wherein, when the PMP unit is inserted into the slot, the processor shares the storage device of the PMP unit to perform operations, and the storage device included in the PMP unit also stores the OS for processing operations by the digital multimedia device.

10. The digital multimedia device as claimed in claim 9, wherein the slot is provided with a docking portion to receive the PMP unit mounted thereon, and a connector arranged to establish communication with the PMP unit, when the PMP unit is mounted on the docking portion.

11. The digital multimedia device as claimed in claim 10, further comprising an eject member disposed corresponding to the docking portion for enabling a user to eject the PMP unit from the docking portion.

12. The digital multimedia device as claimed in claim 10, wherein the PMP unit corresponds to a MP3 player.

13. The digital multimedia device as claimed in claim 9, wherein the storage device is a hard disk drive.

14. A digital multimedia device comprising:

a computer unit including a main body, a first processor included in the main body to operate a first operating system (OS), a first display unit for displaying image information processed by the first processor, and a docking station; and a portable multimedia player (PMP) unit docked to the docking station of the computer unit, and including a second processor to operate a second operating system (OS), a hard disk drive (HDD) for storing programs and data, and a second display unit for displaying image information processed by the second processor;

wherein, when the PMP unit is docked at the docking station of the computer unit, the computer unit shares the hard disk drive (HDD) with the PMP unit to perform operations, and the HDD included in the PMP unit also stores the first OS for processing operations by the computer unit.

15. The digital multimedia device as claimed in claim 14, wherein the docking station is disposed on a side of the main body of the computer unit, to receive the PMP unit mounted thereon, and is provided with a connector to establish communication with the PMP unit, when the PMP unit is docked at the docking station.

16. The digital multimedia device as claimed in claim 14, wherein the computer unit further comprises a window disposed on a surface of the main body for enabling an image displayed on the second display unit of the PMP unit to be viewed by a user, when the PMP unit is docked at the docking station.

17. The digital multimedia device as claimed in claim 14, further comprising an eject member disposed corresponding to the docking station for ejecting the PMP unit from the docking station.

18. The digital multimedia device as claimed in claim 14, wherein the PMP unit corresponds to a MP3 player.

19. The digital multimedia device as claimed in claim 14, wherein the computer unit corresponds to one of a notebook computer, a portable digital assistant (PDA), a hand-held PC, and a mobile device.

20. The digital multimedia device as claimed in claim 1, wherein the PMP unit corresponds to a MP3 player, and the computer unit corresponds to one of a notebook computer, a portable digital assistant (PDA), a hand-held PC, and a mobile device.

\* \* \* \* \*